(12) United States Patent
Shevchenko et al.

(10) Patent No.: US 9,991,512 B2
(45) Date of Patent: Jun. 5, 2018

(54) THERMALLY CONDUCTIVE LITHIUM ION ELECTRODES AND BATTERIES

(71) Applicant: UCHICAGO ARGONNE, LLC, Chicago, IL (US)

(72) Inventors: Elena Shevchenko, Riverside, IL (US); Anirudha V. Sumant, Plainfield, IL (US); Alexander Balandin, Riverside, CA (US); Bonil Koo, Walnut Creek, CA (US); Christopher Johnson, Naperville, IL (US); Tijana Rajh, Naperville, IL (US); Eungje Lee, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 376 days.

(21) Appl. No.: 14/790,449

(22) Filed: Jul. 2, 2015

(65) Prior Publication Data

US 2016/0308263 A1     Oct. 20, 2016

Related U.S. Application Data

(60) Provisional application No. 62/148,553, filed on Apr. 16, 2015.

(51) Int. Cl.
| | |
|---|---|
| *H01M 10/52* | (2006.01) |
| *H01M 4/36* | (2006.01) |
| *H01M 4/131* | (2010.01) |
| *H01M 4/587* | (2010.01) |
| *H01M 4/62* | (2006.01) |
| *H01M 10/052* | (2010.01) |

(52) U.S. Cl.
CPC .......... *H01M 4/366* (2013.01); *H01M 4/131* (2013.01); *H01M 4/587* (2013.01); *H01M 4/625* (2013.01); *H01M 10/052* (2013.01)

(58) Field of Classification Search
None
See application file for complete search history.

(56) References Cited

U.S. PATENT DOCUMENTS

| 6,695,974 B2 | 2/2004 | Withers et al. |
| 8,540,902 B2 | 9/2013 | Xing et al. |
| (Continued) | | |

OTHER PUBLICATIONS

Koo, B. et al., Toward Lithium Ion Batteries with Enhanced Thermal Conductivity, ACS Nano vol. 8, (7), 7202-7207 (2014).
(Continued)

*Primary Examiner* — Tracy Dove
(74) *Attorney, Agent, or Firm* — Olson & Cepuritis, Ltd.

(57) ABSTRACT

A thermally conductive electrochemical cell comprises a lithium ion-containing liquid electrolyte contacting a cathode and anode. The cathode and anode are in the form of electroactive sheets separated from each other by a membrane that is permeable to the electrolyte. One or more of the cathode and anode comprises two or more layers of carbon nanotubes, one of which layers includes electrochemically active nanoparticles and/or microparticles disposed therein or deposited on the nanotubes thereof. The majority of the carbon nanotubes in each of the layers are oriented generally parallel to the layers. Optionally, one or more of the layers includes an additional carbon material such as graphene, nanoparticulate diamond, microparticulate diamond, and a combination thereof.

31 Claims, 7 Drawing Sheets

(56) References Cited

U.S. PATENT DOCUMENTS

| | | |
|---|---|---|
| 2010/0143798 A1 | 6/2010 | Zhamu et al. |
| 2010/0261058 A1 | 10/2010 | Lopatin et al. |
| 2011/0070495 A1 | 3/2011 | Ban et al. |
| 2011/0159372 A1 | 6/2011 | Zhamu et al. |
| 2012/0058397 A1 | 3/2012 | Zhamu et al. |
| 2012/0295166 A1 | 11/2012 | Gennett et al. |
| 2013/0065130 A1 | 3/2013 | Ban et al. |
| 2014/0212763 A1 | 7/2014 | Tzeng et al. |
| 2015/0171419 A1* | 6/2015 | Shevchenko ......... H01M 4/366 429/156 |

OTHER PUBLICATIONS

Koo, B. et al., Hollow Iron Oxide Nanoparticles for Application in Lithium Ion Batteries, Nano Letters 12, 2429-2435 (2012).
Zhu, J. et al., The Application of Graphene in Lithium Ion Battery Electrode Materials, SpringerPlus 3: 585, 1-8 (2014).
Koo, B. et al., Intercalation of Sodium Ions Into Hollow Iron Oxide Nanoparticles, Chemistry of Materials 25, 245-252.
Eguiluz, K.I.B. et al., The Use of Diamond for Energy Conversion System Applications: A Review, Int. Journal of Electrochemistry 2012, Article ID 675124, 1-20 (2011).

* cited by examiner

THERMALLY CONDUCTIVE LITHIUM ION ELECTRODES AND BATTERIES

CROSS-REFERENCE TO RELATED APPLICATIONS

This application claims the benefit of U.S. Provisional Application Ser. No. 62/148,553, filed on Apr. 16, 2015, which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory and Contract No. 2013-MA-2382 from the United States Department of Defense.

FIELD OF THE INVENTION

This invention relates to energy storage devices, notably non-aqueous electrochemical cells and batteries and, more particularly, non-aqueous lithium electrochemical cells and batteries, and electrodes therefor comprising carbon nanotubes, in combination with electroactive nanoparticles or microparticles.

BACKGROUND

Discovery and development of new materials for lithium ion batteries are increasing, with the goal of providing energy storage to, for example, electric and hybrid automotive applications throughout the world. Lithium ion (Li-ion) batteries remain a very important commercial and research focus. Owing to their superior power-density Li-ion batteries are used in a wide variety of applications. As the batteries become more powerful and utilized in diverse applications, thermal management becomes one of the central problems in their application. Charging and discharging of batteries generates considerable amounts of heat due to internal resistance, which in turn can effect battery performance, particularly for larger-scale batteries. Overheating and related safety concerns remain a major problem in battery design. In the case of discharging, the temperature rise is limited by the energy stored in cathode material. No such limit exists in the charging cycle when energy can be pumped even after full charging of the battery. In addition to Ohmic heating, chemical reactions that take place during charging and discharging in Li-ion batteries can also contribute to overheating. If overheating of the battery is not properly addressed, thermal runaway may cause a catastrophic destruction of the battery. From the other side, efficient heat removal from the battery allows for higher electrical currents to be achieved resulting in faster charging rates. These considerations explain the importance of thermal management for operation and safety of any kind of high-power batteries.

There are a number of commonly used methods for removal of the excessive heat from the batteries, e.g., increasing the air flow around the battery or maximizing the surface area of the electrodes. It has been also shown that the thermal effects associated with Li-ion intercalation and deintercalation can be efficiently addressed by the certain combinations of the cathode and anode materials. However, implementation of sophisticated engineered control methods for active cooling via enhanced air flow significantly increases the complexity of the battery design and its weight. The system level approaches cannot help with the localized hot spots and thermal gradients in the case of thick electrodes. The thermal and electrical gradients within the electrodes can lead to unbalanced charging and discharging resulting in lower energy storage capacity.

Improving the thermal conductivity of the electrodes themselves is an important step towards proper thermal management of the batteries. The latter is particularly important for Li-ion batteries because their performance strongly depends on the electrode temperature.

Conventional design of the electrodes involves mixing of the active materials with carbon black, conductive additives and polymer binders that provide the integrity for the electrodes and electrical connectivity. The problem with the carbon black-based electrodes, when used in high-power-density batteries, is their very low thermal conductivity (K), which reportedly is about 0.1 W/mK to about 2 W/mK at room temperature (RT). Such low values likely stem from poor heat conduction properties of amorphous carbon, which is K of about 0.1 to about 1 W/mK near RT, and the mechanical admixture-type structure of the electrodes, which introduces high thermal boundary resistance. The low thermal conductivity of the carbon black-based electrodes leads to their degradation as a result of undesired thermally-activated metal dissolution in the cathodes, or degradation of the solid electrolyte interface (SEI) layer at the anode surface.

There is an ongoing need for new electrode architectures with improved thermal conductivity properties relative to carbon black-based electrodes, for use in Li-ion electrochemical cells and batteries. The electrodes, electrochemical cells, and batteries described herein address this need.

SUMMARY OF THE INVENTION

Graphene and carbon nanotubes (CNTs) have the highest thermal conductivities of all known materials. According to molecular dynamic calculations, the large phonon mean free paths in isolated single-walled CNT results in unusually high thermal conductivities up to about 6,600 W/mK at room temperature that is comparable to the thermal conductivity of an isolated graphene monolayer or graphite. Experimentally, thermal conductivity of single-walled CNT has been reported to be in the range of about 1750 to about 5800 W/mK. The thermal conductivity of individual multi-walled (MW) CNTs at room temperature can be as high as 3000 W/mK. Thus the thermal conductivities of CNTs are larger than the thermal conductivity of high-quality diamond crystals (K of about 2300 W/mK) that are used in semiconductor industry to prevent semiconducting materials from overheating. However, unlike diamond, which is an electrical insulator, graphene and CNTs are electrical conductors and, as such, do not deteriorate electrical conductivity of composite materials. CNTs used as fillers have been reported to improve the electrical conductivity of both anodes and cathodes. Recent studies indicated that CNTs and graphene also can be used as heat conducting fillers in composite materials. Surface functionalization of CNTs, e.g. attachment of certain chemical groups or nanoparticles can improve their thermal coupling to the composite base material. CNTs by themselves have been used as the anode material in Li-ion batteries showing capacities up to about 1000 mAh/g. However, such electrodes suffer from large hysteresis in the voltage profiles between change and discharge states and the absence of a voltage plateau, which limits their utilization in Li-ion batteries.

The present invention provides Li-ion battery electrodes comprising multi-walled carbon nanotubes and nano- or micro-structured metal oxides to provide enhanced thermal properties. As described herein, the highest in-plane and cross-plane thermal conductivities achieved in the carbon nanotube-enhanced electrodes reached up to 141 W/mK and 3.6 W/mK, respectively. The values for in-plane thermal conductivity are up to two orders of magnitude higher than those for conventional electrodes based on carbon black. Exemplary electrodes were synthesized via an inexpensive scalable filtration method, which demonstrate that this approach can be extended to commercial electrode-active materials. The best performing electrodes contain a layer comprising $\gamma\text{-Fe}_2\text{O}_3$ nanoparticles on the surface of carbon nanotubes, which were then sandwiched between two additional layers of carbon nanotubes. These materials exhibited in-plane and cross-plane thermal conductivities of about 50 W/mK and 3 W/mK, respectively, at room temperature. The obtained results are important for thermal management in Li-ion and other high-power-density batteries.

Cation vacancies in hollow $\gamma\text{-Fe}_2\text{O}_3$ nanoparticles (NP) are utilized for efficient lithium ion transport. In situ structural and electronic transformations of hollow iron oxide nanoparticles by synchrotron X-ray adsorption and diffraction techniques have revealed that the cation vacancies in hollow $\gamma\text{-Fe}_2\text{O}_3$ nanoparticles can serve as hosts for lithium ions. Encapsulation of hollow $\gamma\text{-Fe}_2\text{O}_3$ nanoparticles between two layers of carbon nanotubes with additional CNTs in the intermediate layer with the nanoparticles provides light-weight, flexible, and stable electrodes for lithium ion cells, which can be fabricated without binder (i.e., binder-free) and which have excellent thermal conductivity characteristics.

In one aspect, a lithium ion electrochemical cell as described herein comprises a lithium ion-containing liquid electrolyte contacting a cathode and an anode that are separated from each other by a membrane that is permeable to the electrolyte. The cathode and anode each comprise a sheet of at least one electrochemically active material. One or more of the cathode and anode comprises a first layer of carbon nanotubes, a second layer of carbon nanotubes contacting the first layer on one side thereof, and optionally, a third layer of carbon nanotubes arranged such that the second layer is between the first and third layers. The carbon nanotubes in each of the layers have an exterior surface, an interior surface defining a generally hollow interior space therein, a length, and a diameter, in which the length is greater than the diameter. At least a portion of the carbon nanotubes of the second layer comprise electroactive nanoparticles and/or electroactive microparticles adhering to the exterior surfaces thereof. The majority of the carbon nanotubes in each of the layers are oriented, lengthwise, generally parallel to the layers; and optionally, lithium is intercalated within the carbon nanotubes, the nanoparticles, the microparticles, or any combination of two or more thereof. The electroactive nanoparticles and microparticles comprise one or more electrochemically active material selected from the group consisting of a metal oxide, a lithium metal oxide, a metal sulfide, a metal nitride, a metal silicide, a metal aluminide, a metal phosphide, a lithium metal phosphate, and an intermetallic compound or alloy of a transition metal with tin and or antimony.

In another aspect, a lithium ion electrochemical cell as described herein comprises a lithium ion-containing liquid electrolyte contacting a cathode and an anode that are separated from each other by a membrane that is permeable to the electrolyte. The cathode and anode each comprise a sheet of at least one electrochemically active material. One or more of the cathode and anode comprises a first layer of carbon nanotubes, a second layer of carbon nanotubes contacting the first layer on one side thereof, and, optionally a third layer of carbon nanotubes arranged such that the second layer is between the first and third layers. The carbon nanotubes in each of the layers have an exterior surface, an interior surface defining a generally hollow interior space therein, a length, and a diameter, in which the length is greater than the diameter. Electroactive nanoparticles and/or electroactive microparticles are admixed with the carbon nanotubes of the second layer. The majority of the carbon nanotubes in each of the layers are oriented, lengthwise, generally parallel to the layers; and optionally, lithium is intercalated within the carbon nanotubes, the nanoparticles, the microparticles, or any combination of two or more thereof. The electroactive nanoparticles and microparticles comprise one or more electrochemically active material selected from the group consisting of a metal oxide, a lithium metal oxide, a metal sulfide, a metal nitride, a metal silicide, a metal aluminide, a metal phosphide, a lithium metal phosphate, and an intermetallic compound or alloy of a transition metal with tin and or antimony.

In one other aspect, a lithium ion electrochemical cell described herein comprises a lithium ion-containing liquid electrolyte contacting a cathode and an anode. The cathode and anode are in the form of flexible sheets separated from each other by a membrane that is permeable to the electrolyte. One or more of the cathode and anode comprises a first layer of carbon nanotubes, a second layer of carbon nanotubes contacting the first layer on one side thereof, and optionally, a third layer of carbon nanotubes arranged such that the second layer is between the first and third layers. The carbon nanotubes in each of the layers have an exterior surface, an interior surface defining a generally hollow interior space therein, a length, and a diameter, in which the length is greater than the diameter. Electroactive lithium metal oxide microparticles are admixed with the CNTs of the second layer, and/or deposited on (i.e., attached or adhered to) the exterior surfaces of the CNTs of the second layer, and the majority of the carbon nanotubes in each of the layers are o oriented, lengthwise, generally parallel to the layers. Optionally, one or more of the layers of the anode and/or cathode can include an additional carbon material admixed therewith, e.g., graphene, nanoparticulate diamond ("nano-diamond"), microparticulate diamond ("micro-diamond"), or a combination thereof. For example, one or more of the layers can comprise about 20 to about 50 percent by volume of nanoparticulate and/or microparticulate diamond.

In yet another aspect, a lithium ion electrochemical cell comprises a lithium ion-containing liquid electrolyte contacting a cathode and anode; the cathode and anode being in the form of flexible sheets separated from each other by a membrane that is permeable to the electrolyte; and one or more of the cathode and anode comprises a first layer of carbon nanotubes, a second layer of carbon nanotubes contacting the first layer on one side thereof, and, a third layer of carbon nanotubes arranged such that the second layer is between the first and third layers. The carbon nanotubes in each of the layers have an exterior surface, an interior surface defining a generally hollow interior space therein, a length, and a diameter, in which the length is greater than the diameter; and electroactive metal oxide nanoparticles are deposited on (i.e., attached or adhered to) the exterior surfaces of the carbon nanotubes of the second layer. The majority of the carbon nanotubes in each of the layers are oriented, lengthwise, generally parallel to the layers. Optionally, one or more of the layers of the anode and/or cathode can include an additional carbon material admixed therewith, e.g., graphene, nanoparticulate diamond, microparticulate diamond, or a combination thereof. For example, one or more of the layers can comprise about 20 to about 50 percent by volume of nanoparticulate diamond and/or microparticulate diamond.

In still another aspect, a lithium ion electrochemical cell comprises a lithium ion-containing liquid electrolyte contacting a cathode and anode; the cathode and anode being in the form of flexible sheets separated from each other by a membrane that is permeable to the electrolyte; and one or more of the cathode and anode comprises a first layer of carbon nanotubes, a second layer of carbon nanotubes contacting the first layer on one side thereof, and, a third layer of carbon nanotubes arranged such that the second layer is between the first and third layers. Electroactive metal oxide nanoparticles are admixed with of the carbon nanotubes of the second layer. The majority of the carbon nanotubes in each of the layers are o oriented, lengthwise, generally parallel to the layers; and one or more of the layers includes an additional carbon material selected from graphene, nanoparticulate diamond, microparticulate diamond, and a combination thereof.

In some preferred embodiments of the electrochemical cell described above, the carbon nanotubes of each layer can be single-walled or multi-walled CNTs, preferably multi-walled CNTs. Typically, the carbon nanotubes will have an average tube diameter in the range of about 1.5 to about 15 nm and an average tube wall thickness in the range of about 1 to about 6 nm). Lithium and be intercalated within the carbon nanotubes, the nanoparticles, the microparticles, or any combination thereof. Optionally, each of the layers independently can have an average thickness in the range of about 15 to about 50 μm. The carbon nanotubes preferably have lengths in the range of about 0.5 to about 200 μm (e.g., about 1 to about 25 μm), and typically are mixtures of carbon nanotubes with various lengths in this range.

The electroactive microparticles and nanoparticles of the anode or cathode can comprise any electroactive material suitable for use as an electrode material in lithium electrochemical cells, including, e.g., a metal oxide, a lithium metal oxide, a metal sulfide, a metal nitride, a metal silicide, a metal aluminide, a metal phosphide, a lithium metal phosphate, and an intermetallic compound or alloy of a transition metal with tin and or antimony. Non-limiting examples of such electrochemically active materials include, e.g., $LiMO_2$ wherein M comprises one or more first row transition metals (e.g., one or more of Ni, Co and Mn, such as $LiCoO_2$, $Li[Co/Ni/Mn]O_2$, $Li[Co/Ni]O_2$, $Li[Ni/Mn]O_2$, and the like), $LiMn_{2-x}M'_xO_4$ (x≤0.50), $LiMn_2O_4$, $Li_{1+y}Mn_{2-x}M_xO_4$ (y≤0.3, x≤0.50), $Li_xV_yO_z$ (e.g., $LiV_3O_8$), $Li_2Mn_2O_4$, $Li_2MnO_3$, composite layered-layered lithium metal oxides (e.g., $xLi_2MnO_3\cdot(1-x)LiM'O_2$ in which M' comprises one or more of Mn, Ni and Co, and 0.5≤x<1.0, e.g., x is about 0.7), composite layered-spinel lithium metal oxides (e.g., $xLi_2MnO_3\cdot(1-x)LiMn_{2-x}M''_xO_4$ in which M'' is a metal cation selected preferably from Li, Ni, Co, Al and Mg and 0<x<1), $Li_4Ti_5O_{12}$, $Li[Cr/Ti]O_4$, $Li[Zn/Cd/Ni]VO_4$, $Li_yMo_3$ (0<y<1), metal chalcogenides (e.g., metal sulfides and metal oxides, e.g., metal oxides such as $M_xO_y$ materials (e.g., $\gamma$-$Fe_2O_3$, $Co_3O_4$, $Mn_3O_4$, $\alpha$-$Fe_2O_3$, $TiO_2$, $RVO_4$ (R=In, Fe), and $XV_2O_4$ (X=Fe, Mn Co)), metal nitrides (e.g., $Zn_3N$), metal silicides (e.g. $Mg_2Si$), metal aluminides (e.g. $LiAl_2Cu$), metal phosphides (e.g., $CoP_3$), metal Sn/Sb intermetallics (e.g., Cu/Sn, Cu/Sb alloys and compounds), lithium metal phosphate materials (e.g., $LiM'PO_4$; M'=a transition metal such as Fe, Mn, Co; olivines) and the like, where the metals of the electroactive materials comprise one or more monovalent or multivalent metal, such as one or more transition metal (e.g., Fe, V, Mo, Co, Ni, Mn, Cr, Ti, Cu, Cd), one or more main group metal (e.g., Al, Mg, Sn, In), or a combination of transition metal(s) and main group metal(s).

In some embodiments, electroactive metal oxide nanoparticles comprise hollow $\gamma$-$Fe_2O_3$ nanoparticles comprising a crystalline shell of $\gamma$-$Fe_2O_3$ including iron cation vacancies within the crystal structure thereof and defining a cavity within the nanoparticles. Optionally, lithium ions are intercalated within the cation vacancies of the hollow $\gamma$-$Fe_2O_3$ nanoparticles. Some preferred hollow $\gamma$-$Fe_2O_3$ nanoparticles have an average particle size in the range of about 3.5 to about 17 nm, and individual nanoparticles comprise a crystalline $\gamma$-$Fe_2O_3$ shell having an average thickness in the range of about 1.1 to about 6 nm.

In some embodiments, electroactive lithium metal oxide microparticles comprise, (i.e., in a fully discharged state), for example, a layered lithium metal oxide of formula $LiMO_2$, wherein M comprises one or more first row transition metals (e.g., one or more of Ni, Co and Mn). In one preferred embodiment, the first row transition metals comprise Ni, Co and Mn in substantially equal atomic proportions.

In some preferred embodiments, the cathode and/or anode materials can be prepared without the use of a binder (i.e., binder free materials).

The present invention also provides a battery comprising a plurality of electrically connected lithium ion electrochemical cells, as described above, arranged in series, parallel, or both series and parallel.

As used herein with respect to a cathode material for a lithium ion electrochemical cell, the term "discharged state" and grammatical variations thereof, refers to the material in a "fully discharged" and in a "partially discharged" state, i.e., to a cathode material, such as a lithium metal oxide material (e.g. Li[Ni/Co/Mn]$O_2$), which includes its maximum capacity of lithium ions (the "fully discharged" cathode material) and to a material that contains some electroactive lithium ions, but less than the full capacity thereof (i.e., a "partially discharged" cathode material). A discharged anode material includes its minimum level of lithium. With reference to an lithium or lithium ion electrochemical cell, the term "fully charged" means that the maximum amount of lithium is present in the anode and the minimum amount of lithium is present in the cathode. Likewise, the term "fully discharged" in reference to a lithium or lithium ion electrochemical cell, means that the minimum amount of lithium is present in the anode and the maximum amount of lithium is present in the cathode. The term "charging" refers to the process wherein a net flow of lithium is transferring from the cathode to the anode; and the term "discharging" refers to the process wherein a net flow of lithium is transferring from the anode to the cathode.

The non-aqueous solvent component of the electrolyte can include a single solvent or a combination of two or more solvents. Non-limiting examples of such solvents include ethylene carbonate, propylene carbonate, dimethyl carbonate, and ethyl methyl carbonate, as well as combinations of two or more such carbonates. Non-limiting examples of other non-aqueous solvents include esters (e.g., gamma-butyrolactone, methyl formate, methyl acetate), ethers (e.g., diethoxyethane, tetrahydrofuran, 2-methyltetrahydrofuran, 1,3-dioxane), nitriles (e.g., acetonitrile), sulfolanes, and the like. The non-aqueous solvent preferably comprises an organic carbonate, such as dimethyl carbonate (DMC), ethyl methyl carbonate (EMC), ethylene carbonate (EC), propylene carbonate (PC), or a combination of two or more of the foregoing. A preferred solvent comprises ethylene carbonate and ethyl methyl carbonate in respective weight ratio of approximately 3:7. Preferably, the concentration of lithium salt in the non-aqueous solvent is in the range of about 0.1 molar (M) to about 5 molar, more preferably about 1 M to about 1.5 M (e.g., about 1.2 M), for example, 1.2 M $LiPF_6$ in ethylene carbonate/ethyl methyl carbonate (3:7 weight ratio).

The lithium salt of the electrolyte can be any lithium salt that is soluble in one or more of the non-aqueous solvents described above, e.g., $LiPF_6$, $LiBF_4$, $LiF_2BC_2O_4$, $LiB(C_2O_4)_2$, $LiClO_4$, $LiAsF_6$, $LiN(SO_2CF_3)_2$, $LiC(SO_2CF_3)_3$, $LiSO_3CF_3$, and $LiPF_3(CF_2CF_3)_3$. In a preferred embodiment, the lithium salt comprises $LiPF_6$, e.g., at a concentration in the range of about 1M to about 1.5 M in the non-aqueous solvent.

The following non-limiting embodiments are provide to illustrate certain aspects of the methods described herein.

Embodiment 1 is a lithium ion electrochemical cell comprising or consisting of a lithium ion-containing liquid electrolyte contacting a cathode and an anode that are separated from each other by a membrane that is permeable to the electrolyte. The cathode and anode each comprises or consist of a sheet of at least one electrochemically active material, in which one or more of the cathode and anode comprise a first layer of carbon nanotubes, a second layer of carbon nanotubes contacting the first layer on one side thereof, and, optionally, a third layer of carbon nanotubes arranged such that the second layer is between the first and third layers. The carbon nanotubes in each of the layers have an exterior surface, an interior surface defining a generally hollow interior space therein, a length, and a diameter, in which the length is greater than the diameter. At least a portion of the carbon nanotubes of the second layer comprise electroactive nanoparticles and/or electroactive microparticles adhering to the exterior surfaces thereof. The majority of the carbon nanotubes in each of the layers are oriented, lengthwise, generally parallel to the layers. Optionally, lithium is intercalated within the carbon nanotubes, the nanoparticles, the microparticles, or any combination of two or more thereof. The electroactive nanoparticles and microparticles comprise one or more electrochemically active material selected from the group consisting of a metal oxide, a lithium metal oxide, a metal sulfide, a metal nitride, a metal silicide, a metal aluminide, a metal phosphide, a lithium metal phosphate, and an intermetallic compound or alloy of a transition metal with tin and or antimony.

Embodiment 2 comprises or consists of the electrochemical cell of Embodiment 1, wherein the carbon nanotubes of each layer comprise multi-walled carbon nanotubes.

Embodiment 3 comprises or consists of the electrochemical cell of Embodiment 2, wherein the carbon nanotubes of each layer independently have an average tube diameter in the range of about 1.5 to about 15 nm, an average tube wall thickness in the range of about 1 to about 6 nm, and lengths in the range of about 0.5 to about 200 micrometers (μm).

Embodiment 4 comprises or consists of the electrochemical cell of Embodiment 3, wherein the majority of the carbon nanotubes have lengths in the range of about 80 to about 150 μm.

Embodiment 5 comprises or consists of the electrochemical cell of Embodiment 4, wherein at least a portion of the carbon nanotubes of each layer have lengths in the range of about 2 to about 10 μm.

Embodiment 6 comprises or consists of the electrochemical cell of Embodiment 1, wherein one or more of the layers includes an additional carbon material admixed therewith.

Embodiment 7 comprises or consists of the electrochemical cell of Embodiment 6, wherein the additional carbon material comprises graphene, nanoparticulate diamond, microparticulate diamond, or a combination thereof.

Embodiment 8 comprises or consists of the electrochemical cell of Embodiment 1, wherein one or more of the layers comprises about 20 to about 50 percent by volume of nanoparticulate diamond and/or microparticulate diamond.

Embodiment 9 comprises or consists of the electrochemical cell of Embodiment 1, wherein each of the layers independently has an average thickness in the range of about 15 to about 50 μm.

Embodiment 10 comprises or consists of the electrochemical cell of Embodiment 1, wherein the electroactive nanoparticles comprise hollow $\gamma$-$Fe_2O_3$ nanoparticles comprising a crystalline shell of $\gamma$-$Fe_2O_3$ including iron cation vacancies within the crystal structure thereof and defining a cavity within the nanoparticles; and the electroactive microparticles comprise, in a fully discharged state, a lithium metal oxide of formula $LiMO_2$, wherein M comprises one or more first row transition metals (e.g., $LiCoO_2$, $Li[Ni_{1/3}Co_{1/3}Mn_{1/3}]O_2$, and the like).

Embodiment 11 comprises or consists of the electrochemical cell of Embodiment 10, wherein the first row transition metals are selected from one or more of Ni, Co and Mn.

Embodiment 12 comprises or consists of the electrochemical cell of Embodiment 10, wherein the first row transition metals comprise Ni, Co and Mn in substantially equal atomic proportions.

Embodiment 13 comprises or consists of the electrochemical cell of Embodiment 10, wherein lithium ions are intercalated within the cation vacancies of the hollow $\gamma$-$Fe_2O_3$ nanoparticles.

Embodiment 14 comprises or consists of the electrochemical cell of Embodiment 10, wherein the hollow $\gamma$-$Fe_2O_3$ nanoparticles have an average particle size in the range of about 3.5 to about 17 nm, and individual nanoparticles comprise a crystalline $\gamma$-$Fe_2O_3$ shell having an average thickness in the range of about 1.1 to about 6 nm.

Embodiment 15 is a lithium ion electrochemical cell comprising or consisting of a lithium ion-containing liquid electrolyte contacting a cathode and an anode that are separated from each other by a membrane that is permeable to the electrolyte. The cathode and anode each comprise or consist of a sheet containing at least one electrochemically active material. One or more of the cathode and anode comprises a first layer of carbon nanotubes, a second layer of carbon nanotubes contacting the first layer on one side thereof, and, optionally a third layer of carbon nanotubes arranged such that the second layer is between the first and third layers. The carbon nanotubes in each of the layers have an exterior surface, an interior surface defining a generally hollow interior space therein, a length, and a diameter, in which the length is greater than the diameter. Electroactive nanoparticles and/or electroactive microparticles are admixed with the carbon nanotubes of the second layer. The majority of the carbon nanotubes in each of the layers are oriented, lengthwise, generally parallel to the layers. Optionally, lithium is intercalated within the carbon nanotubes, the nanoparticles, the microparticles, or any combination of two or more thereof. The electroactive nanoparticles and microparticles comprise one or more electrochemically active material selected from the group consisting of a metal oxide, a lithium metal oxide, a metal sulfide, a metal nitride, a metal silicide, a metal aluminide, a metal phosphide, a lithium metal phosphate, and an intermetallic compound or alloy of a transition metal with tin and or antimony.

Embodiment 16 comprises or consists of the electrochemical cell of Embodiment 15, wherein the carbon nanotubes of each layer are multi-walled carbon nanotubes.

Embodiment 17 comprises or consists of the electrochemical cell of Embodiment 15, wherein the carbon nanotubes of each layer independently have an average tube diameter in the range of about 1.5 to about 15 nm, an average tube wall thickness in the range of about 1 to about 6 nm, and lengths in the range of about 0.5 to about 200 μm.

Embodiment 18 comprises or consists of the electrochemical cell of Embodiment 17, wherein the majority of the carbon nanotubes have lengths in the range of about 80 to about 150 μm.

Embodiment 19 comprises or consists of the electrochemical cell of Embodiment 18, wherein at least a portion of the carbon nanotubes of each layer have lengths in the range of about 2 to about 10 μm.

Embodiment 20 comprises or consists of the electrochemical cell of Embodiment 15, wherein one or more of the layers includes an additional carbon material admixed therewith, wherein the additional carbon material comprises graphene, nanoparticulate diamond, microparticulate diamond, or a combination thereof.

Embodiment 21 comprises or consists of the electrochemical cell of Embodiment 15, wherein the electroactive nanoparticles comprise hollow $\gamma$-$Fe_2O_3$ nanoparticles comprising a crystalline shell of $\gamma$-$Fe_2O_3$ including iron cation vacancies within the crystal structure thereof and defining a cavity within the nanoparticles; and the electroactive microparticles comprise, in a fully discharged state, a lithium metal oxide of formula $LiMO_2$, wherein M comprises one or more first row transition metals (e.g., $LiCoO_2$, $Li[Ni_{1/3}Co_{1/3}Mn_{1/3}]O_2$, and the like).

Embodiment 22 method for enhancing in-plane and/or cross-plane thermal conductivity in an electrochemical cell that comprises electrodes that include one or more layers of electroactive materials; the method comprising placing one or more layers of carbon nanotubes within, or on, one or more of the electrodes, wherein the carbon nanotubes have an exterior surface, an interior surface defining a generally hollow interior space therein, a length, and a diameter, in which the length is greater than the diameter; electroactive metal oxide nanoparticles and/or electroactive lithium metal oxide microparticles are adhered to the exterior surfaces of the carbon nanotubes; and the majority of the carbon nanotubes are oriented generally parallel to the layers of the electrodes.

Embodiment 23 comprises or consists of the method of Embodiment 22, wherein an additional carbon material is placed within one or more of the electrodes, the additional carbon material comprises graphene, nanoparticulate diamond, microparticulate diamond, or a combination thereof.

Embodiment 24 comprises or consists of the method of Embodiment 22, wherein the carbon nanotubes have an average tube diameter in the range of about 1.5 to about 15 nm, an average tube wall thickness in the range of about 1 to about 6 nm, and lengths in the range of about 0.5 to about 200 μm.

Embodiment 25 comprises or consists of the method of Embodiment 24, wherein a majority of the carbon nanotubes have lengths in the range of about 80 to about 150 μm.

Embodiment 26 comprises or consists of the method of Embodiment 25, wherein at least a portion of the carbon nanotubes of each layer have lengths in the range of about 0.5 to about 50 μm.

Embodiment 27 comprises or consists of the method of Embodiment 26 wherein the proportion of carbon nanotubes having lengths in the range of 80 to 150 μm is varied with respect to the proportion of carbon nanotubes having lengths in the range of about 0.5 to about 50 μm to modulate the thermal conductivity of the electrode.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF PREFERRED EMBODIMENTS

Battery electrodes with significantly enhanced thermal conductivity are provided by the present invention. A thermally conductive electrochemical cell, as described herein comprises a lithium ion-containing liquid electrolyte contacting a cathode and anode. The cathode and anode are in the form of flexible sheets (preferably binder-free sheets) separated from each other by a membrane that is permeable to the electrolyte (e.g., a porous polyolefin membrane, such as porous polypropylene). One or more of the cathode and anode comprises two or more layers of carbon nanotubes, one of which layers includes electrochemically active nanoparticles or microparticles disposed therein or deposited on the nanotubes thereof. The majority of the carbon nanotubes in each of the layers are oriented generally parallel to the layers. Optionally, one or more of the layers includes an additional carbon material such as graphene, nanoparticulate diamond, microparticulate diamond, and a combination thereof. Addition of other carbon materials, such as diamond nanoparticles, diamond microparticles, and graphene, can provide even better thermal conductivity than obtained with CNTs alone.

Figure 1:
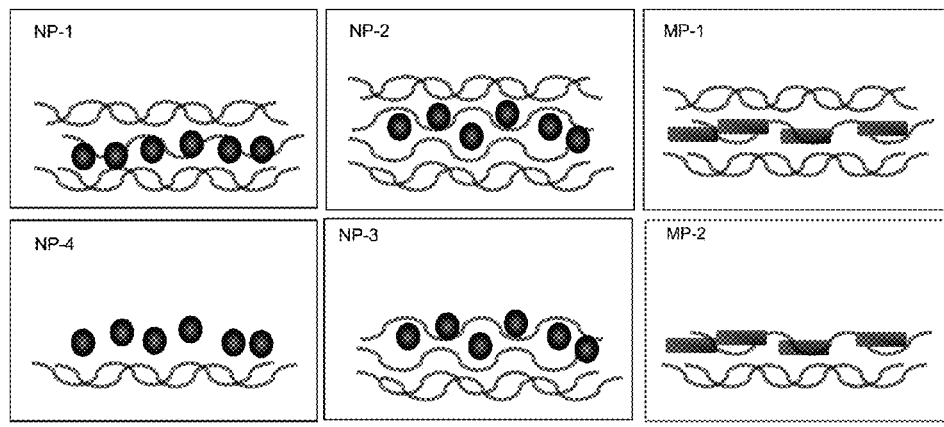
FIG. 1 schematically illustrates the layered sheet structure of the CNT-enhanced battery electrodes; dots and rectangles depict hollow $\gamma$-$Fe_2O_3$ nanoparticles (NPs) and $Li[Ni_{1/3}Co_{1/3}Mn_{1/3}]O_2$ microparticles (MPs), respectively; in sample NP-1 hollow $\gamma$-$Fe_2O_3$ NPs were synthetized on the surface of CNTs and sandwiched between two layers of CNTs; in samples NP-2, NP-3, MP-1 and MP-2 active particles were admixed with CNTs and further used to make a layer of active material; in sample NP-4, the layer of hollow $\gamma$-$Fe_2O_3$ NPs was deposited directly on the formed layer of CNTs; vacuum filtration of corresponding solutions was applied to fabricate electrode structures; the CNTs in each case were oriented substantially along the same plane as the sheet.

Multi-walled-CNTs were utilized as a matrix for encapsulation of electrochemically active cathode materials to fabricate electrodes for Li-ion batteries. The electrode material is prepared by the scalable and inexpensive filtration method, previously developed for sandwiching of nanometer-scale electrochemically active materials (see Koo et al. *Chem. Mater.* 2013, 25:245-252; Koo et al. *Nano Lett.* 2012, 12:2429-2435, and copending U.S. application Ser. No. 14/133,137 to Shevchenko et al., filed on Dec. 18, 2013). The filtration of the CNT suspension and the active cathode materials is carried out in isopropanol. For the present study a set of CNT-enhanced samples with different layered sheet structures were synthesized and evaluated. The sample nomenclature and compositions of the tested electrode structures are presented in Table 1 and Table 2. The structures of the samples are illustrated in FIG. 1.

TABLE 1

Nomenclature of the tested samples

| Sample | Layered Structure | Tests Performed |
|---|---|---|
| NP-1 | CNTs/{γ-Fe$_2$O$_3$ NPs on CNTs}/CNTs | battery capacity; in-plane K; cross-plane K |
| NP-2 | CNTs/{γ-Fe$_2$O$_3$ NPs + CNTs}/CNTs | battery capacity; cross-plane K |
| NP-3 | CNTs/{γ-Fe$_2$O$_3$ NPs + CNTs} | in-plane K; cross-plane K |
| NP-4 | CNTs/γ-Fe$_2$O$_3$ NPs | in-plane K; cross-plane K |
| MP-1 | CNTs/{Li[Ni$_{1/3}$Co$_{1/3}$Mn$_{1/3}$]O$_2$ + CNTs}/CNTs | battery capacity; cross-plane K |
| MP-2 | CNTs/{Li[Ni$_{1/3}$Co$_{1/3}$Mn$_{1/3}$]O$_2$ + CNTs} | in-plane K; cross-plane K |
| REF-1 | CNT bundle | cross-plane K |

In sample NP-1 hollow γ-Fe$_2$O$_3$ NPs were synthetized on the surface of CNTs and sandwiched between two layers of CNTs; in samples NP-2, NP-3, MP-1 and MP-2 active particles were admixed with CNTs and further used to make a layer of active material; in sample NP-4, the layer of hollow γ-Fe$_2$O$_3$ NPs was deposited directly on the formed layer of CNTs; vacuum filtration of corresponding solutions was applied to fabricate electrode structures; the CNTs in each case were oriented substantially along the same plane as the sheet. The CNTs were multi-walled CNTs having a length of about 2 to 200 µm, an average tube diameter in the range of about 1.5 to about 15 nm, and an average tube wall thickness in the range of about 1 to about 6 nm.

TABLE 2

Composition of the tested samples

| | | Composition (mg) | | |
|---|---|---|---|---|
| Sample | Layered Structure | Layer 1 | Active layer | Layer 2 |
| NP-1 | CNTs/{γ-Fe$_2$O$_3$ NPs on CNTs}/CNTs | 4.5625 | 9.1250 | 4.5625 |
| NP-2 | CNTs/{γ-Fe$_2$O$_3$ NPs + CNTs}/CNTs | 4.5950 | 9.9559 | 4.5950 |
| NP-3 | CNTs/{γ-Fe$_2$O$_3$ NPs + CNTs} | 4.4582 | 9.4738 | — |
| NP-4 | CNTs/γ-Fe$_2$O$_3$ NPs | 4.5119 | 2.0271 | — |
| MP-1 | CNTs/{Li[Ni$_{1/3}$Co$_{1/3}$Mn$_{1/3}$]O$_2$ + CNTs}/CNTs | 4.5602 | 9.1205 | 4.5602 |
| MP-2 | CNTs/{Li[Ni$_{1/3}$Co$_{1/3}$Mn$_{1/3}$]O$_2$ + CNTs} | 4.4618 | 9.9312 | — |
| REF-1 | CNT bundle | 10.002 | — | — |

Figure 2:
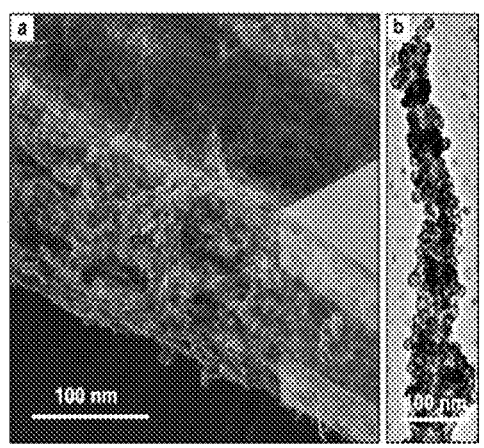
FIG. 2 provides (a) a scanning electron microscopy image of the cross-section of the CNT enhanced battery electrodes (note that CNTs are predominantly oriented along the sample plane); and (b) a scanning electron microscopy image showing nanoparticles grown on CNTs.

Scanning electron microscopy (SEM) inspection indicates that the typical average thickness of the three-layered electrode (i.e., CNTs/cathode material/CNTs) is about 140 µm (see FIG. 2; panel "a"). The average thickness of each CNT layer was determined to be about 35 µm. The individual MW-CNTs were predominantly aligned parallel to the substrate. The latter has important implications for thermal transport. In addition to electrode materials that exhibited the best electrochemical performance, such as active material sandwiched between two layers of CNTs, thermal conductivity measurements for reference samples in different configurations were also performed (FIG. 1).

Figure 3:
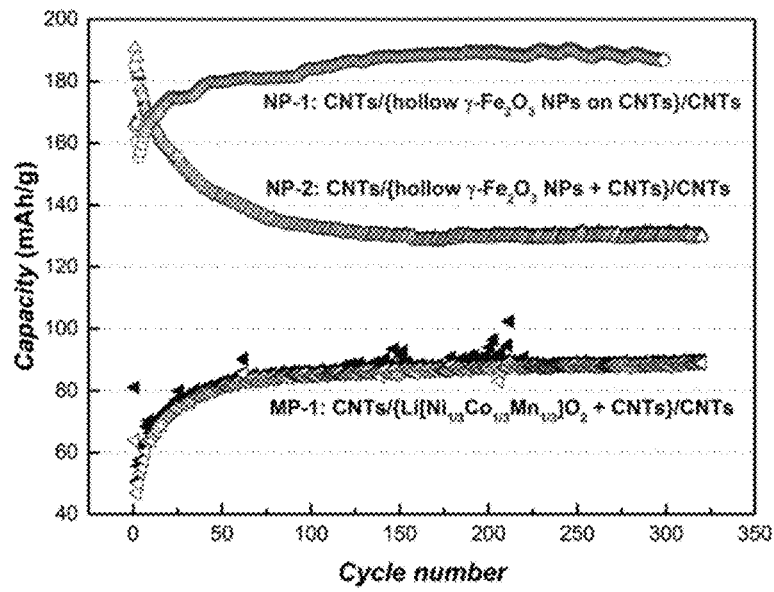
FIG. 3 provides graphs of the charge (filled symbols) and discharge (open symbols) capacities versus cycle number for CNT-enhanced electrode structures; the cycling rate was 300 mA/g.

One type of the electrode contained hollow γ-Fe$_2$O$_3$ nanoparticles (NPs) synthetized directly on the CNTs (FIG. 2; panel "b"). The hollow NPs have a void inside the iron oxide nano-shell. This void is formed as a result of the coalescence of the iron vacancies during the oxidation of iron. The hollow γ-Fe$_2$O$_3$ NPs are about 15 nm large with about 4 nm thick shell. The γ-Fe$_2$O$_3$-NP-on-CNT layer was sandwiched between two layers of CNTs forming the CNTs/{γ-Fe$_2$O$_3$-NPs on CNTs}/CNTs structure. This structure was measured to have about 187 mAh/g capacity when cycled in cathode regime (4.5-1.5 V), excellent stability (no fading during 300 cycles) and 99.9% Coulombic efficiency (FIG. 3). No current collectors were used in electrochemical tests. The results of the tests indicated that this electrode (sample NP-1) was the best in terms of its battery cathode performance.

The cycling of the electrode is accompanied by thermal effects and heat removal may depend on the coupling between the CNTs and electrochemically active γ-Fe$_2$O$_3$ NPs. In order to study the effects of coupling of NPs and CNTs on the battery capacity and thermal conductivity, a sample where NPs were mixed with CNTs (not synthesized on them) was also analyzed. The mixed CNT-NP layer was sealed between two layers of CNTs forming CNTs/{hollow γ-Fe$_2$O$_3$ NPs+CNTs}/CNTs structure (sample NP-2). As seen in FIG. 3, the electrochemical performance of these electrodes (capacity of about 130 mAh/g) was not as good as that of the electrodes that contained $\gamma$-Fe$_2$O$_3$ NP synthesized on the surface of the CNTs (capacity of about 187 mAh/g).

A distinctively different type of electrode utilizes Li[Ni$_{1/3}$Co$_{1/3}$Mn$_{1/3}$]O$_2$ lithium metal oxide microparticles (MPs). A mixture of CNTs and Li[Ni$_{1/3}$Co$_{1/3}$Mn$_{1/3}$]O$_2$ MPs was sandwiched between two layers of CNTs by the filtration method forming CNTs/{Li[Ni$_{1/3}$Co$_{1/3}$Mn$_{1/3}$]O$_2$+CNTs}/CNTs layers (sample MP-1). The thickness of the layers was similar to that in the NP-based electrodes. The electrochemical tests indicated that such electrodes have a lower capacity (FIG. 3) as compared to electrodes fabricated via conventional approach; however, their cycle stability was significantly higher. No capacity fading was observed up to 800 cycles while about 25-28% capacity loss after 50 cycles was reported for the same cathode material fabricated via a conventional method. The capacity of this battery increased upon cycling up to 50 cycles and then stabilized. The stable performance is another attractive feature of CNT-enhanced electrode designs.

Figure 4:
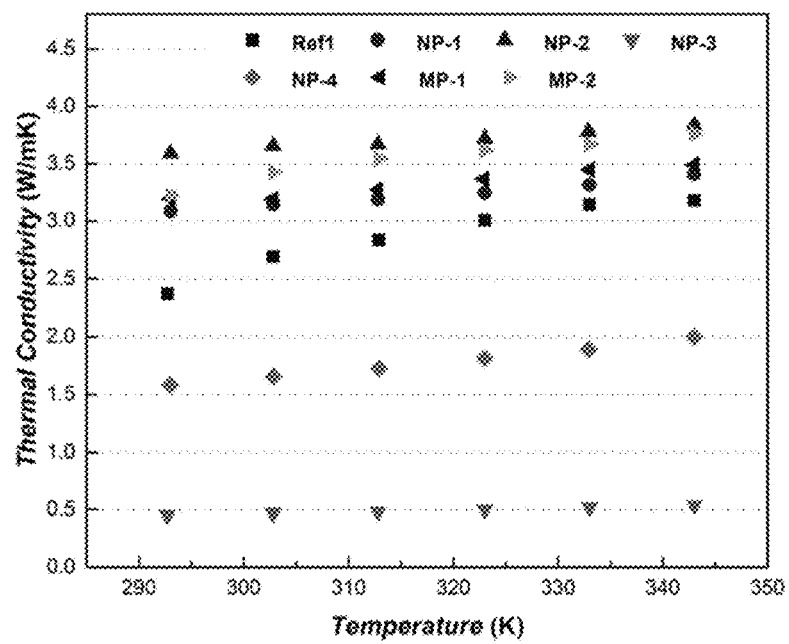
FIG. 4 provides plots of cross-plane thermal conductivity for CNT enhanced electrode structures.

The thermal conductivity of the samples was determined using two different techniques: "laser flash" and "hot disk". Owing to the complicated structure of the samples and the "hot disk" equipment limitations, the in-plane thermal conductivity was measured at RT only. The cross-plane thermal conductivity was determined in the range from 290 K to 350 K using the "laser flash" method. The details of the measurement procedures are given in the Experimental Section. The cross-plane thermal conductivity as a function of temperature for a set of examined electrodes is shown in FIG. 4. The cross-plane thermal conductivity defines the heat transport through the electrode, i.e., perpendicular to the sample substrate. It can be seen that the cross-plane thermal conductivity values are in the range from about 0.5 W/mK to about 3.6 W/mK. Although the overall values are not significantly enhanced, many of them are higher than those in conventional electrodes. The strong increase in cross-plane thermal conductivity is an unexpected benefit, because CNTs are predominantly oriented in-plane (along the substrate). In addition, the layered structure of the electrodes results in substantial thermal interface resistance between the layers, e.g., between CNT layer and the {$\gamma$-Fe$_2$O$_3$ NPs+CNTs} layer or between CNT layer and the substrate. The thermal conductivity increases slightly with the temperature or stays approximately constant. Such temperature dependence is indicative of a material system with a large degree of disorder.

Figure 5:
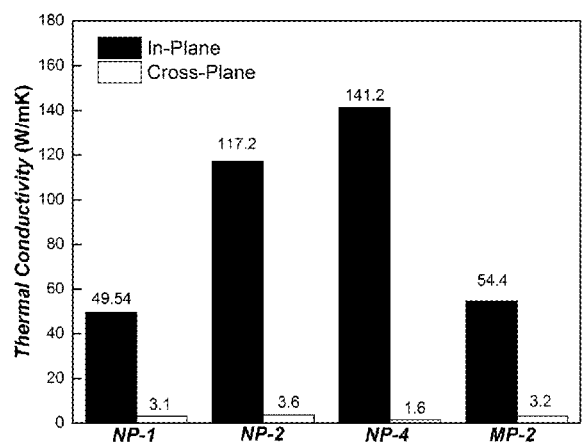
FIG. 5 provides a comparison of the in-plane and cross-plane thermal conductivity of the CNT enhanced battery electrodes at room temperature.

FIG. 5 shows in-plane and cross-plane thermal conductivity for a set of different samples at RT. The in-plane thermal conductivity is substantially higher than the cross-plane conductivity, e.g., due to the predominantly in-plane (along the substrate) orientation of CNTs. The in-plane values range from 50 W/mK to 141 W/mK. The NP-1 sample, which had the best electrochemical performance, revealed the thermal conductivity of 50 W/mK. This value is about two orders of magnitude higher than a thermal conductivity of the conventional carbon black-based electrodes and at least two times higher than the in-plane thermal conductivity of commercial Sony Li-ion electrodes with engineered controls for heat removal such as a copper current collector. The tested electrodes of the present invention did not include a metal current collector of any type.

Surprisingly, the measured in-plane thermal conductivity values for these electrodes were typically even higher that the reported data for CNT bundles of the comparable thickness, i.e., K of about 15 W/mK, which may be attributable to differences in density and orientation of CNTs in the electrodes obtained by the filtration method. In fact, the thermal conductivity of NP-4 electrode, K=141 W/mK, is almost an order of magnitude higher than the values typically reported for CNT bundles. Such high thermal conductivity may be attributable to sealing of CNTs during the filtration of the suspension of $\gamma$-Fe$_2$O$_3$ NPs.

The cross-plane thermal conductivity surprisingly is in the range from 1.6 W/mK to 3.6 W/mK. The electrode with the best electrochemical performance revealed a thermal conductivity value of 3.1 W/mK at RT. This value is about an order of magnitude higher than that of the carbon black-based electrode materials. It is also higher than the cross-sectional thermal conductivity of the electrodes of commercial Sony Li-ion batteries, i.e., 2.33 W/mK and 0.89 W/mK, for positive and negative electrodes, respectively. The measured data indicate that all tested CNT electrodes revealed substantially enhanced in-plane and cross-plane thermal conductivities as compared to electrodes synthesized by the conventional techniques, even though the enhancement is not as high as in the electrodes based on ordered CNT arrays. The electrodes of the invention described herein were fabricated by the inexpensive scalable filtration method, which can be extended to commercial electrode-active materials while the fabrication of ordered CNT arrays is still prohibitively expensive. The systematic study of thermal properties of CNT enhanced samples did not show a clear correlation with the specifics of the layered structure.

Figure 6:
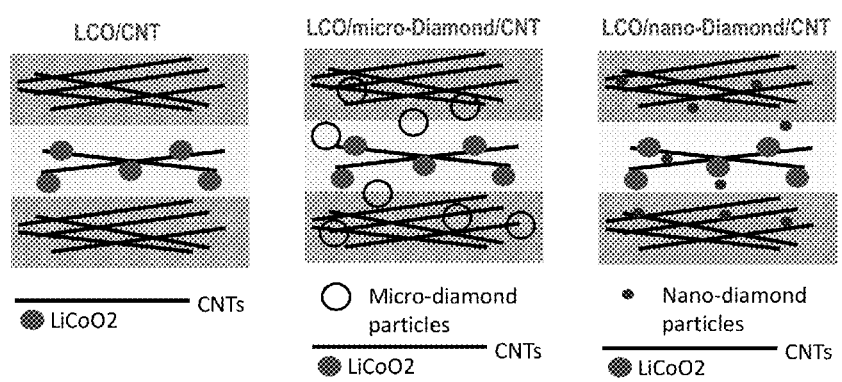
FIG. 6 schematically illustrates layered electrodes prepared from carbon nanotubes and microparticles of $LiCoO_2$ as the electroactive material, with and without added diamond particles.

In another example, layered electrodes were prepared from carbon nanotubes and microparticles of LiCoO$_2$ as the electroactive material, with and without added diamond particles, as schematically illustrated in FIG. 6. The first electrode (illustrated in the left panel of FIG. 6) included a layer of LiCoO$_2$ admixed with carbon nanotubes, sandwiched between two layers of the same carbon nanotubes. The second electrode (illustrated in the middle panel of FIG. 6) had the same structure as the first electrode, but with diamond microparticles (micro-diamonds) added to the layers. The third electrode (illustrated in the right panel of FIG. 6) had the same structure as the first electrode, but with diamond nanoparticles (nano-diamonds) added to the layers. The LiCoO$_2$ had a particle size in the range of about of about 5 to about 10 $\mu$m. The micro-diamonds had a particle size in the range of about 8 to about 18 $\mu$m. The nano-diamonds had a particle size in the range of about 4 to about 5 nm. The carbon nanotubes used in these electrodes were relatively monodisperse in length, with an average length of about 100 $\mu$m, and diameters in the range of about 5 to about 30 nm (average diameter of about 15 nm).

Figure 7:
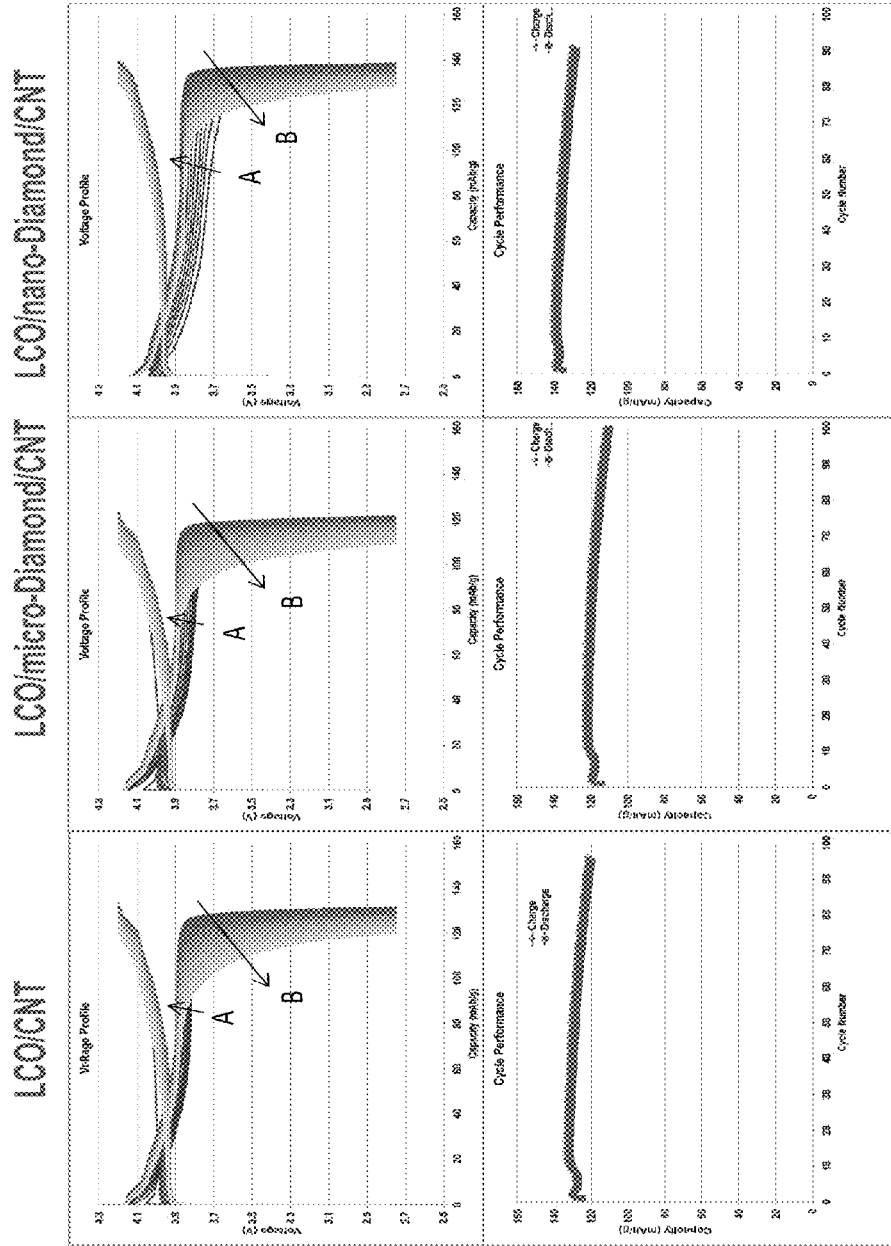
FIG. 7 provides graphs of voltage versus capacity (top row) and capacity versus cycle number (bottom row) for three electrodes ("LCO/CNT", left column; "LCO/micro-Diamond/CNT", middle column; and "LCO/nano-Diamond/CNT", right column) cycled at constant currant between about 2.75 to about 4.2 V at a 0.5 C rate; capacity of 70 mA/g.

FIG. 7 provides graphs of voltage versus capacity (top row) and capacity versus cycle number (bottom row) for the first electrode ("LCO/CNT"; left column), the second electrode ("LCO/micro-Diamond/CNT"; middle column), and the third electrode ("LCO/nano-Diamond/CNT"; right column) cycled at constant currant between about 2.75 to about 4.2 V at a 0.5 C rate; capacity of 70 mA/g. The electrodes required about 10 cycles to reach a stable performance level. During the initial cycles, polarization decreased (the process labeled "A"). there was a gradual capacity drop and impedance build-up at later cycles (the process labeled "B"). The electrodes exhibited a capacity retention that was essentially equivalent to the reported capacity of a conventional laminate electrode comprising LiCoO$_2$ (e.g., as reported in Lithium Batteries: Science and Technology, G. Nazri and G. Pistoia, Eds., Springer Science+Business Media LLC, New York, N.Y., 2003; ISBN 978-0-387-92674-2; see. FIG. 14.7 on page 417 and FIG. 14.9 on page 419 thereof).

Figure 8:
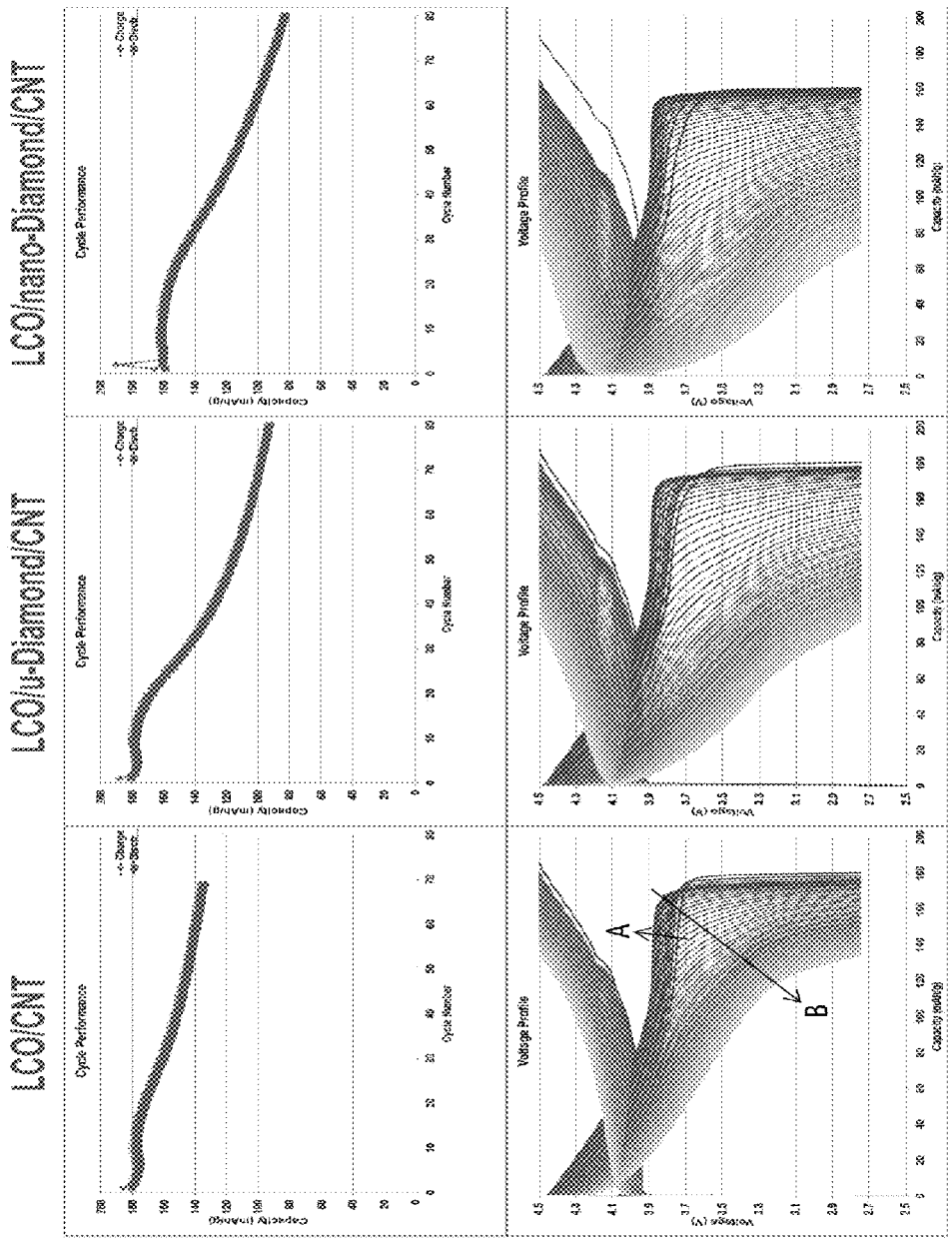
FIG. 8 provides graphs of capacity versus cycle number (top row) and voltage versus capacity (bottom row) for the electrodes referred to in FIG. 7 cycled between about 2.75 to about 4.5 V at a 0.5 C rate.

FIG. 8 provides graphs of capacity versus cycle number (top row) and voltage versus capacity (bottom row) for the first electrode ("LCO/CNT"; left column), the second electrode ("LCO/micro-Diamond/CNT"; middle column), and the third electrode ("LCO/nano-Diamond/CNT"; right column) cycled at higher cut-off voltage than in FIG. 7, between about 2.75 to about 4.5 V at a 0.5 C rate. The electrodes required about 10 cycles to reach a stable performance level. The electrodes exhibited substantially better cycling performance at a cut-off of 4.5 V compared to the conventional laminate electrode comprising $LiCoO_2$ referred to in the discussion of FIG. 7. A capacity drop in the range of about 19 to 36% was observed for the carbon nanotube based electrodes compared to about 54% capacity drop for the conventional laminate electrode.

Figure 9:
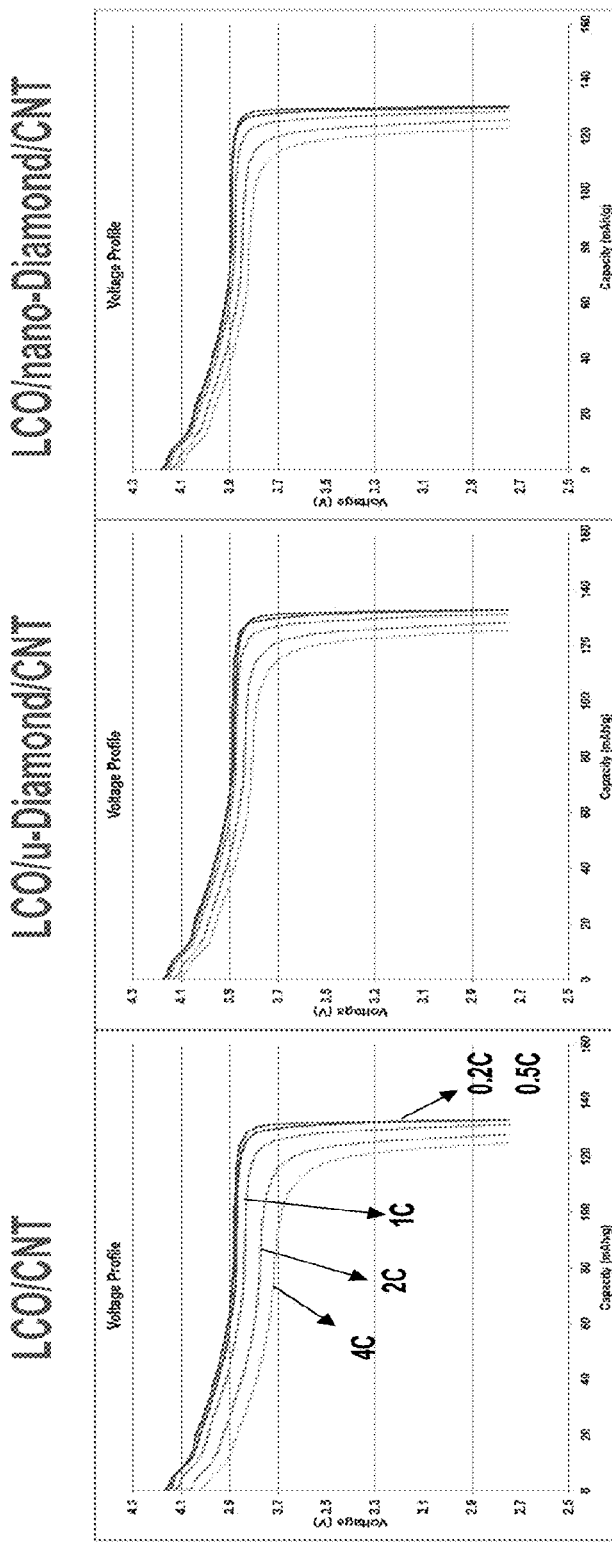
FIG. 9 illustrates the voltage versus capacity performance of the electrodes referred to in FIG. 6 at different cycling rates (0.2 C, 0.5 C, 1 C, 2 C and 4 C).

FIG. 9 illustrates the voltage versus capacity performance of the electrodes of FIG. 6 at different cycling rates (0.2 C, 0.5 C, 1 C, 2 C and 4 C). The diamond containing electrodes unexpectedly exhibited lower polarization (better rate performance) at high rates.

In order to assess the relative effectiveness of different carbon nanotube (CNT) materials for enhancing thermal conductivity, a series of CNT sheet materials were prepared with the same amount (10 mg) of the CNT materials used in the electrodes on FIG. 6 (100 μm long, 2 to 30 nm diameter, 15 nm average diameter) per sheet, with and without nano-diamond, micro-diamond, or short CNTs (5 μm long) added to the sheets. Table 3 summarizes the amounts of the different CNT and diamond materials in the tested sheets, as well as the observed in-plane and cross-plane thermal conductivities of the materials, in comparison with the first electrode shown in FIG. 6, described above (i.e., using the 100 μm CNTs and no added diamond material).

TABLE 3

Thermal conductivity of carbon-based sheet electrodes.

| Sample | In-plane thermal conductivity W/mK | Cross-plane thermal conductivity W/mK |
| --- | --- | --- |
| CNT (10 mg) | 88.42 | 0.087 |
| CNT (10 mg) + nano-Diamond (4.2 mg) | 116.57 | 0.253 |
| CNT (10 mg) + nano-Diamond (8.4 mg) | 71.68 | 0.120 |
| CNT (10 mg) + micro-Diamond (4.2 mg) | 125.11 | 0.142 |
| CNT (10 mg) + micro-Diamond (8.5 mg) | 94.81 | 0.128 |
| CNT (10 mg) + short CNTs (1 mg) | 86.78 | 0.107 |
| CNT (10 mg) + short CNTs (5 mg) | 122.66 | 0.254 |
| Three-layered electrode (characterized electrochemically) CNT(4 mg)/CNT(2 mg) + $LiCoO_2$ (55 mg)/CNT (4 mg) | 180.00 | 0.22 |

The data in Table 3 demonstrate that addition of up to about 4 mg of nano-diamond to the 10 mg CNT material increased the in-plane thermal conductivity by about 30% and dramatically increased the cross-plane thermal conductivity by about 290%. Doubling the amount of nano-diamond reduced the in-plane thermal conductivity to below the comparative material with no diamond, whereas the cross-plane thermal conductivity was still about 40% higher than the thermal conductivity of the comparative material. With added micro-diamond, the materials with about 4 and 8 mg of added diamond both exhibited higher in-plane and higher cross-plane thermal conductivities that the comparative material with no diamond. The addition 1 mg or 5 mg of short CNTs also increased cross-plane thermal conductivity in both cases. While addition of 1 mg of short CNTs had little effect on in-plane conductivity, addition of 5 mg resulted in an increase of about 38% for the in-plane thermal conductivity. These results demonstrate that the thermal conductivity of carbon-based electrodes can be controlled or modulated by adding oriented CNTs of different lengths, as well as nano- and micro-diamond materials to the electrode structure.

Conclusions

The thermal properties of Li-ion battery electrodes enhanced with multi-walled CNTs indicate that the CNT enhanced electrodes surprisingly exhibit up to two orders of magnitude enhancement of the thermal conductivity. The in-plane thermal conductivity in some electrodes reached about 141 W/mK at RT. The described approach for increasing the thermal conductivity can be extended to commercial electrode-active materials. The obtained results are important for thermal management of Li-ion and other high-power-density batteries. The method of electrode fabrication allows for further improvements of the thermal conductivity of the electrode structures in Li-ion batteries by ready incorporation of graphene, diamond nanoparticles and/or diamond microparticles in addition to the CNTs. The thermal conductivity results described herein demonstrate that the thermal conductivity of carbon-based electrodes can be controlled or modulated by adding oriented CNTs of different lengths, as well as nano and micro-diamond materials to the electrode structure.

Experimental Details and Methods

Materials Synthesis and Electrochemical Testing:

The CNTs used in this work were purchased from Aldrich (≥95% purity, product and CAS numbers are 636487 and 308068-56-6, respectively). The dimensions (O.D×I.D.×L) of multi-walled CNTs were 20-30 nm×5-10 nm×0.5-200 μm, respectively. Hollow $\gamma$-$Fe_2O_3$ NPs and $\gamma$-$Fe_2O_3$ NPs on CNTs were synthetized according the synthetic protocols described in Koo et al. *Nano Lett.* 2012, 12:2429-2435. In order to fabricate CNT-based electrodes 4.0 mg of multi-walled CNTs were dispersed in 150 mL of isopropyl alcohol (IPA) and sonicated for about 5 minutes. After that the suspension of CNTs was filtrated by vacuum through the filter (microporous polyolefin separator, CELGARD 2325) that served as a separator in electrochemical tests. As a result, a black paper made of CNTs was formed onto the filter. The active layer was fabricated in the same manner: 12.0 mg of electrode material (hollow $\gamma$-$Fe_2O_3$ NPs or $Li[Ni_{1/3}Co_{1/3}Mn_{1/3}]O_2$) mixed with 3 mg of CNTs in IPA were vacuum-filtrated forming a uniform layer. In case of hollow $\gamma$-$Fe_2O_3$ NPs synthetized on the surface of CNTs, 15 mg of the material that contained about 12.0 mg of $\gamma$-$Fe_2O_3$ NPs and about 3 mg of CNTs were used (see Table 2 for samples composition details). After the evaporation of the solvent residue, the CNT-based composite electrodes were annealed in an oven at about 200° C. for about 12 hours and were then used in electrochemical tests without any additional processing. The TEM and SEM inspection of the samples was carried out using JEOL 2100F and JEOL 7500F instruments, respectively. The electrochemical tests were performed with the 2032 coin type cells with Li metal foil as the counter electrodes and 1.2 M $LiPF_6$ in ethylene carbonate/ethyl methyl carbonate (3:7 weight ratio) electrolyte (Tomiyama). Half-cell cycles were operated at 300 mA/g between 4.5-1.5 V vs. Li/Li' using an automated MACCOR battery tester at ambient temperature. The voltage range for hollow $\gamma$-$Fe_2O_3$ NPs and $Li[Ni_{1/3}Co_{1/3}Mn_{1/3}]O_2$ were 4.5V-1.5V and 4.5-2.0V, respectively.

Thermal Measurements:

The cross-plane thermal conductivity was measured using a noncontact optical "laser flash" technique (Netzsch LFT). LFT is a transient method that directly measures thermal diffusivity. In order to perform LFT measurements each sample was placed into a special stage, a xenon flash lamp produced shots with an energy of 10 J/pulse on the sample surface while the temperature rise was measured at the other end with an InSb infrared (IR) detector. The thermal conductivity was determined from the equation K=$\rho\alpha C_p$, where $\rho$ is the mass density of the sample and $C_p$ is the specific heat of the sample measured with the Netzsch instrument separately. The in-plane thermal conductivity of the samples was measured using the transient planar source (TPS) technique (HOT DISK TPS2500). For these measurements, an electrically insulated flat nickel sensor with a radius of 0.5 mm is sandwiched between two identical parts of the same sample. The sensor acted as the heat source and temperature monitor simultaneously (see Gustafsson et al. *J. Phys. D: Appl. Phys.* 1986, 19:727; Gustafsson et al. *Rev. Sci. Instrum.* 1991, 62:797; and Gustafsson et al. *Int. J. Thermophys.* 2006, 27:816-1825). The surfaces of the specimens were flattened and cleaned to reduce the thermal conduct resistance at the sensor-sample surfaces. Thermal properties of the material are determined by recording the temperature rise as a function of time using the equation:

$$\overline{\Delta T(\tau)} = P(\pi^{\frac{3}{2}} rK)^{-1} D(\tau), \text{ where } \tau = (t_m \alpha/r^2)^{1/2}$$

where $\alpha$ is the thermal diffusivity, $t_m$ is the transient measurement time, r is the radius of the sensor, P is the input heating power, and $D(\tau)$ is the modified Bessel function. The time and the input power are chosen so that the heat flow is within the sample boundaries and the temperature rise of the sensor is not influenced by the outer boundaries of the sample (see Gustafsson et al. *J. Phys. D: Appl. Phys.* 1986, 19:727; Gustafsson et al. *Rev. Sci. Instrum.* 1991, 62:797; and Gustafsson et al. *Int. J. Thermophys.* 2006, 27:816-1825).

Exemplary Electrochemical Cell and Battery.

Figure 10:
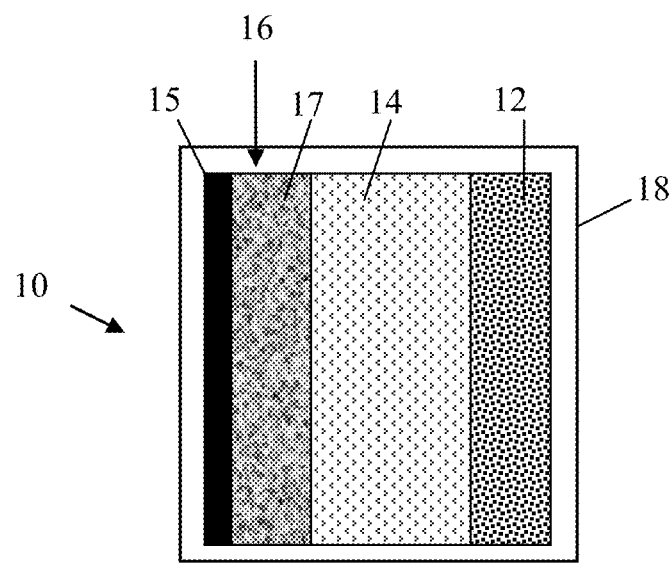
FIG. 10 provides a schematic representation of a lithium ion electrochemical cell described herein.
Figure 11:
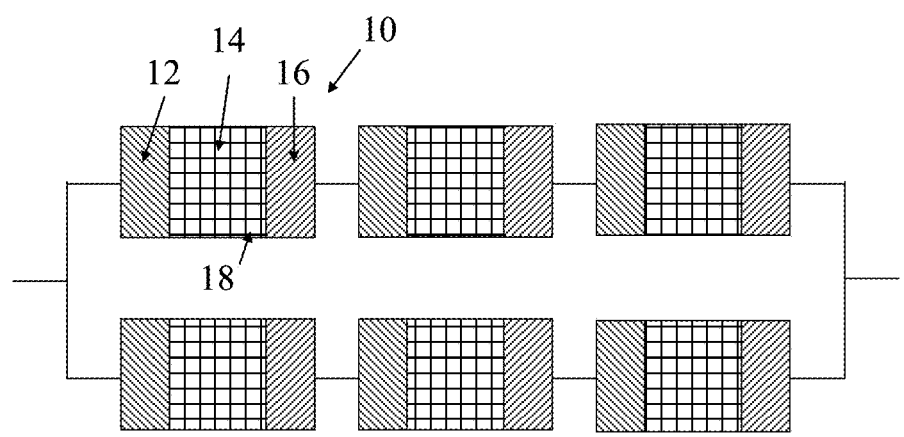
FIG. 11 provides a provides a schematic representation of a battery comprising a plurality of electrically connected lithium ion electrochemical cells as described herein.

A detailed schematic illustration of a lithium ion electrochemical cell 10 of the invention is shown in FIG. 10. Cell 10 comprises negative electrode 12 separated from positive electrode 16 by a porous separator membrane 14 saturated with a lithium-containing non-aqueous electrolyte, all contained in insulating housing 18 with suitable terminals (not shown) being provided in electronic contact with negative electrode 12 and positive electrode 16 of the invention. Positive electrode 16 optionally comprises metallic collector plate 15 and active layer 17 comprising, e.g., a layered sheet structure as described herein, for example, as shown in FIG. 1 or FIG. 6. Binders and other materials, such as carbon, normally associated with both the electrolyte and the negative and positive electrodes are well known in the art and are not described herein, but can be included as is understood by those of ordinary skill in this art. In preferred embodiments, however, binders for the cathode and/or anode can be omitted in the layered structures described herein. FIG. 11 provides a schematic illustration of one example of a battery in which two strings of electrochemical lithium ion cells 10, described above, are arranged in parallel, each string comprising three cells 10 arranged in series.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A lithium ion electrochemical cell comprising:
    a lithium ion-containing liquid electrolyte contacting a cathode and an anode that are separated from each other by a membrane that is permeable to the electrolyte;
    the cathode and anode each comprising a sheet of at least one electrochemically active material, in which one or more of the cathode and anode comprise a first layer of carbon nanotubes, and a second layer of carbon nanotubes contacting the first layer on one side thereof;
wherein:
the carbon nanotubes in each of the layers have an exterior surface, an interior surface defining a generally hollow interior space therein, a length, and a diameter, in which the length is greater than the diameter;
at least a portion of the carbon nanotubes of the second layer comprise electroactive nanoparticles, electroactive microparticles, or a combination thereof adhering to the exterior surfaces of the carbon nanotubes of the second layer;
the majority of the carbon nanotubes in each of the layers are oriented, lengthwise, generally parallel to the layers; and
the electroactive nanoparticles and microparticles comprise one or more electrochemically active material selected from the group consisting of a metal oxide, a lithium metal oxide, a metal sulfide, a metal nitride, a metal silicide, a metal aluminide, a metal phosphide, a lithium metal phosphate, an intermetallic compound of a transition metal with a non-transition metal element, and intermetallic alloy of a transition metal with a non-transition metal element wherein the non-transition metal element is selected from the group consisting of tin, antimony, and a combination thereof.

2. The electrochemical cell of claim 1, wherein the carbon nanotubes of each layer comprise multi-walled carbon nanotubes.

3. The electrochemical cell of claim 2, wherein the carbon nanotubes of each layer independently have an average tube diameter in the range of about 1.5 to about 15 nm, an average tube wall thickness in the range of about 1 to about 6 nm, and lengths in the range of about 0.5 to about 200 micrometers (µm).

4. The electrochemical cell of claim 3, wherein the majority of the carbon nanotubes of each layer have lengths in the range of about 80 to about 150 µm.

5. The electrochemical cell of claim 4, wherein at least a portion of the carbon nanotubes of each layer have lengths in the range of about 2 to about 10 µm.

6. The electrochemical cell of claim 1, wherein one or more of the layers includes an additional carbon material admixed therewith.

7. The electrochemical cell of claim 6, wherein the additional carbon material comprises a material selected from the group consisting of graphene, nanoparticulate diamond, microparticulate diamond, and a combination thereof.

8. The electrochemical cell of claim 1, wherein one or more of the layers comprises about 20 to about 50 percent by volume of nanoparticulate diamond, microparticulate diamond, or a combination thereof.

9. The electrochemical cell of claim 1, wherein each of the layers independently has an average thickness in the range of about 15 to about 50 µm.

10. The electrochemical cell of claim 1, wherein the electroactive nanoparticles comprise hollow $\gamma$-$Fe_2O_3$ nanoparticles comprising a crystalline shell of $\gamma$-$Fe_2O_3$ including iron cation vacancies within the crystal structure thereof and defining a cavity within the nanoparticles; and the electroactive microparticles comprise, in a fully discharged state, a lithium metal oxide of formula $LiMO_2$, wherein M comprises one or more first row transition metals.

11. The electrochemical cell of claim 10, wherein the first row transition metals comprise one or more metals selected from the group consisting of Ni, Co and Mn.

12. The electrochemical cell of claim 10, wherein the first row transition metals comprise Ni, Co and Mn in substantially equal atomic proportions.

13. The electrochemical cell of claim 10, wherein lithium ions are intercalated within the cation vacancies of the hollow $\gamma$-$Fe_2O_3$ nanoparticles.

14. The electrochemical cell of claim 10, wherein the hollow $\gamma$-$Fe_2O_3$ nanoparticles have an average particle size in the range of about 3.5 to about 17 nm, and individual nanoparticles comprise a crystalline $\gamma$-$Fe_2O_3$ shell having an average thickness in the range of about 1.1 to about 6 nm.

15. A lithium ion electrochemical cell comprising:
a lithium ion-containing liquid electrolyte contacting a cathode and an anode that are separated from each other by a membrane that is permeable to the electrolyte;
the cathode and anode each comprising a sheet containing at least one electrochemically active material; one or more of the cathode and anode comprising a first layer of carbon nanotubes, and a second layer of carbon nanotubes contacting the first layer on one side thereof;
wherein:
the carbon nanotubes in each of the layers have an exterior surface, an interior surface defining a generally hollow interior space therein, a length, and a diameter, in which the length is greater than the diameter;
electroactive nanoparticles, electroactive microparticles, or a combination thereof are admixed with the carbon nanotubes of the second layer;
the majority of the carbon nanotubes in each of the layers are oriented, lengthwise, generally parallel to the layers;
and
the electroactive nanoparticles and microparticles comprise one or more electrochemically active material selected from the group consisting of a metal oxide, a lithium metal oxide, a metal sulfide, a metal nitride, a metal silicide, a metal aluminide, a metal phosphide, a lithium metal phosphate, an intermetallic compound of a transition metal with a non-transition metal element, and intermetallic alloy of a transition metal with a non-transition metal element wherein the non-transition metal element is selected from the group consisting of tin, antimony, and a combination thereof.

16. The electrochemical cell of claim 15, wherein the carbon nanotubes of each layer are multi-walled carbon nanotubes.

17. The electrochemical cell of claim 15, wherein the carbon nanotubes of each layer independently have an average tube diameter in the range of about 1.5 to about 15 nm, an average tube wall thickness in the range of about 1 to about 6 nm, and lengths in the range of about 0.5 to about 200 µm.

18. The electrochemical cell of claim 17, wherein the majority of the carbon nanotubes of each layer have lengths in the range of about 80 to about 150 µm.

19. The electrochemical cell of claim 18, wherein at least a portion of the carbon nanotubes of each layer have lengths in the range of about 2 to about 10 µm.

20. The electrochemical cell of claim 15, wherein one or more of the layers includes an additional carbon material admixed therewith, and wherein the additional carbon material comprises graphene, nanoparticulate diamond, microparticulate diamond, or a combination thereof.

21. The electrochemical cell of claim 15, wherein the electroactive nanoparticles comprise hollow $\gamma$-$Fe_2O_3$ nanoparticles comprising a crystalline shell of $\gamma$-$Fe_2O_3$ including iron cation vacancies within the crystal structure thereof and defining a cavity within the nanoparticles; and the electroactive microparticles comprise, in a fully discharged state, a lithium metal oxide of formula $LiMO_2$, wherein M comprises one or more first row transition metals.

22. A method for enhancing in-plane thermal conductivity, cross-plane thermal conductivity, or both in-plane and cross-plane thermal conductivity in an electrochemical cell that comprises electrodes that include one or more layers of electroactive materials; the method comprising placing one or more layers of carbon nanotubes within, or on, one or more of the electrodes, wherein the carbon nanotubes have an exterior surface, an interior surface defining a generally hollow interior space therein, a length, and a diameter, in which the length is greater than the diameter; electroactive metal oxide nanoparticles, electroactive lithium metal oxide microparticles, or both electroactive metal oxide nanoparticles and microparticles are adhered to the exterior surfaces of the carbon nanotubes; and the majority of the carbon nanotubes are oriented generally parallel to the layers of the electrodes.

23. The method of claim 22, wherein an additional carbon material is placed within one or more of the electrodes, and the additional carbon material comprises graphene, nanoparticulate diamond, microparticulate diamond, or a combination thereof.

24. The method of claim 22, wherein the carbon nanotubes have an average tube diameter in the range of about 1.5 to about 15 nm, an average tube wall thickness in the range of about 1 to about 6 nm, and lengths in the range of about 0.5 to about 200 μm.

25. The method of claim 24, wherein a majority of the carbon nanotubes have lengths in the range of about 80 to about 150 μm.

26. The method of claim 25, wherein at least a portion of the carbon nanotubes have lengths in the range of about 0.5 to about 50 μm.

27. The method of claim 26 wherein the proportion of carbon nanotubes having lengths in the range of 80 to 150 μm is varied with respect to the proportion of carbon nanotubes having lengths in the range of about 0.5 to about 50 μm to modulate the thermal conductivity of the electrode.

28. The electrochemical cell of claim 1, wherein one or more of the cathode or the anode comprises a third layer of carbon nanotubes arranged such that the second layer is between the first and third layers.

29. The electrochemical cell of claim 1, wherein in each of the first layer and the second layer lithium is intercalated within the carbon nanotubes, the nanoparticles, the microparticles, or any combination of two or more thereof.

30. The electrochemical cell of claim 15, wherein one or more of the cathode or the anode comprises a third layer of carbon nanotubes arranged such that the second layer is between the first and third layers.

31. The electrochemical cell of claim 15, wherein in each of the first layer and the second layer lithium is intercalated within the carbon nanotubes, the nanoparticles, the microparticles, or any combination of two or more thereof.

* * * * *